(12) United States Patent
Sukeforth et al.

(10) Patent No.: US 12,479,341 B2
(45) Date of Patent: Nov. 25, 2025

(54) CAR SEAT BELT TENSION INDICATOR

(71) Applicant: MONAHAN PRODUCTS, LLC, Rockland, MA (US)

(72) Inventors: Carl J. Sukeforth, Milton, MA (US); Anthony P. Sandonato, Abington, MA (US)

(73) Assignee: MONAHAN PRODUCTS, LLC, Rockland, MA (US)

( * ) Notice: Subject to any disclaimer, the term of this patent is extended or adjusted under 35 U.S.C. 154(b) by 217 days.

(21) Appl. No.: 18/384,443

(22) Filed: Oct. 27, 2023

(65) Prior Publication Data
US 2025/0135965 A1 May 1, 2025

(51) Int. Cl.
*B60N 2/28* (2006.01)
*B60N 2/26* (2006.01)

(52) U.S. Cl.
CPC .......... *B60N 2/2816* (2023.08); *B60N 2/265* (2013.01); *B60N 2/2806* (2013.01)

(58) Field of Classification Search
CPC ..... B60N 2/2816; B60N 2/265; B60N 2/2806
See application file for complete search history.

(56) References Cited

U.S. PATENT DOCUMENTS

| | | | |
|---|---|---|---|
| 6,854,415 B2 | 2/2005 | Barnes et al. | |
| 7,163,265 B2 * | 1/2007 | Adachi | B60N 2/286 297/256.16 |
| 7,224,270 B2 | 5/2007 | Patterson et al. | |
| 7,242,286 B2 | 7/2007 | Knox | |
| 7,422,283 B2 | 9/2008 | Patterson et al. | |
| 7,735,920 B2 | 6/2010 | Hinze et al. | |
| 8,262,161 B2 * | 9/2012 | Fritz | B60N 2/2863 297/256.16 |
| 8,272,689 B2 | 9/2012 | Biaud et al. | |
| 8,322,788 B2 | 12/2012 | Williams et al. | |
| 8,434,821 B2 | 5/2013 | Gibree | |
| 8,973,992 B2 * | 3/2015 | Guo | B60N 2/2806 24/68 R |
| 9,315,124 B2 | 4/2016 | Lehman et al. | |
| 10,857,916 B2 * | 12/2020 | Glerum | B60R 22/105 |
| 2006/0053903 A1 | 3/2006 | Berenyi et al. | |
| 2007/0068282 A1 | 3/2007 | Nakagawa et al. | |
| 2007/0228802 A1 | 10/2007 | Nakhla | |
| 2008/0251002 A1 | 10/2008 | Burleigh | |
| 2014/0300155 A1 | 10/2014 | Lehman et al. | |
| 2018/0297495 A1 * | 10/2018 | Glerum | B60N 2/2812 |
| 2019/0380451 A1 * | 12/2019 | Geist | A44B 11/065 |

FOREIGN PATENT DOCUMENTS

| | | |
|---|---|---|
| AU | 2014100324 A4 | 5/2014 |
| CN | 103192792 A | 7/2013 |
| CN | 203752939 U | 8/2014 |

(Continued)

*Primary Examiner* — Philip F Gabler
(74) *Attorney, Agent, or Firm* — Lando & Anastasi, LLP

(57) ABSTRACT

A tension indicator assembly for a child restraint system including a chassis; a blade slidably coupled to the chassis; a biasing element coupled to the chassis and to the blade and configured to bias the blade in a first position; a wing pivotably coupled to the chassis and configured to selectively contact the blade; and a tab coupled to the blade and configured to selectively pivot the wing based on a position of the blade.

23 Claims, 10 Drawing Sheets

(56) References Cited

FOREIGN PATENT DOCUMENTS

| | | |
|---|---|---|
| CN | 103770672 B | 9/2016 |
| EP | 1767408 A2 | 3/2007 |
| FR | 08 58274 A | 11/1940 |
| WO | 2005/108154 A1 | 11/2005 |
| WO | 2016015526 A1 | 2/2016 |

* cited by examiner

CAR SEAT BELT TENSION INDICATOR

BACKGROUND

Child restraint systems are used to restrain infants and children in safe positions. For example, some child restraint systems include a removeable car seat that is designed to hold a child, and that interfaces with a preexisting bench or bucket seat in the car such that the car seat is held firmly in place. In a crash or other adverse event, the car seat provides additional protection for the occupant.

SUMMARY

According to at least one aspect of the present disclosure a tension indicator assembly for a child restraint system is presented, the tension indicator comprising: a chassis; a blade slidably coupled to the chassis; a biasing element coupled to the chassis and to the blade and configured to bias the blade in a first position; a wing pivotably coupled to the chassis and configured to selectively contact the blade; and a tab coupled to the blade and configured to selectively pivot the wing based on a position of the blade.

In some examples, the wing further comprises: a first section corresponding to a first range of tensions; a second section corresponding to a second range of tensions; and a lever, wherein the tab is configured to contact the lever. In some examples, the position of the blade is based on a force applied to the blade. In some examples, a greatest tension of the first range of tensions is less than a least tension of the second range of tensions; and the wing is configured to pivot from a position corresponding to the first section to a position corresponding to the second section. In some examples, the blade is at least 46 mm wide. In some examples, the blade includes a rounded top-section configured to contact a retention strap. In some examples, the blade includes a recess configured to hold the biasing element. In some examples, the biasing element is a spring. In some examples, the tension indicator further comprises a transparent viewport coupled to the chassis and coupled above at least a portion of the wing.

According to at least one aspect of the present disclosure, a car seat is presented, the car seat comprising a base; and a tension indicator, the tension indicator including: a chassis; a blade slidably coupled to the chassis; a biasing element configured to bias the blade into a first position; a wing pivotably coupled to the chassis and configured to selectively contact the blade; and a tab coupled to the blade and configured to selectively pivot the wing based on a position of the blade.

In some examples, the slot is configured to retain the blade such that movement of the blade within the slot is minimized in at least one direction. In some examples, the wing further comprises: a first section corresponding to a first range of tensions; a second section corresponding to a second range of tensions; and a lever, the tab being configured to contact the lever. In some examples, the position of the blade is based on a force applied to the blade. In some examples, a greatest tension of the first range of tensions is less than a least tension of the second range of tensions; and applying at least a threshold force to the blade is configured to cause the wing to pivot from a position corresponding to the first section to a position corresponding to the second section. In some examples, the blade is at least 46 mm wide. In some examples, the blade includes a rounded top-section configured to interface with a retention strap. In some examples, the blade includes a recess configured to hold the biasing element. In some examples, the biasing element is a spring. In some examples, the car seat further comprises a transparent viewport coupled to the chassis and coupled above at least a portion of the wing, the transparent viewport placed to be visible to a user of the car seat. In some examples, the base further comprises: a first opening configured to receive a retention strap; a second opening configured to receive the retention strap; and a joint configured to selectively open and close the first and second openings. In some examples, the base includes a slot configured to receive the tension indicator, and the tension indicator is configured to be removably installed in the slot. In some examples, a section of the blade is shaped to concentrate a distribution of tension to a region of the blade, wherein the tension is due to a retention strap contacting the blade. In some examples, the blade is shaped according to at least one of the following shapes: a stepped shape; a convex shape; a concave shape; and a flat shape.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Car seats used in child restraint systems often incorporate retention straps that hold the car seat in place. For example, the seatbelts of the preexisting bench or bucket seat in the car may be used as a convenient retention strap for the car seat. Retention straps should apply a certain amount of force to the car seat to ensure the car seat is secured in place. The force exerted by the retention strap can be measured in terms of tension in the strap itself.

Aspects and elements of the present disclosure relate to an apparatus and method for measuring tension in the retention strap and determining that the tension is adequate to hold the car seat in place. An assembly is presented that provides a device that indicates the level of tension provided by a retention strap. The assembly is wide enough that the entire width of the retention strap can be accommodated by the assembly; as a result, tension corresponding to tension present in the entire width of the retention strap is applied to the assembly, as opposed to tension corresponding to only a section of the retention strap. The assembly converts tension in the retention strap into a measurement of force applied to keep the car seat in place, and presents the tension level in a simple and straightforward manner.

Figure 1:
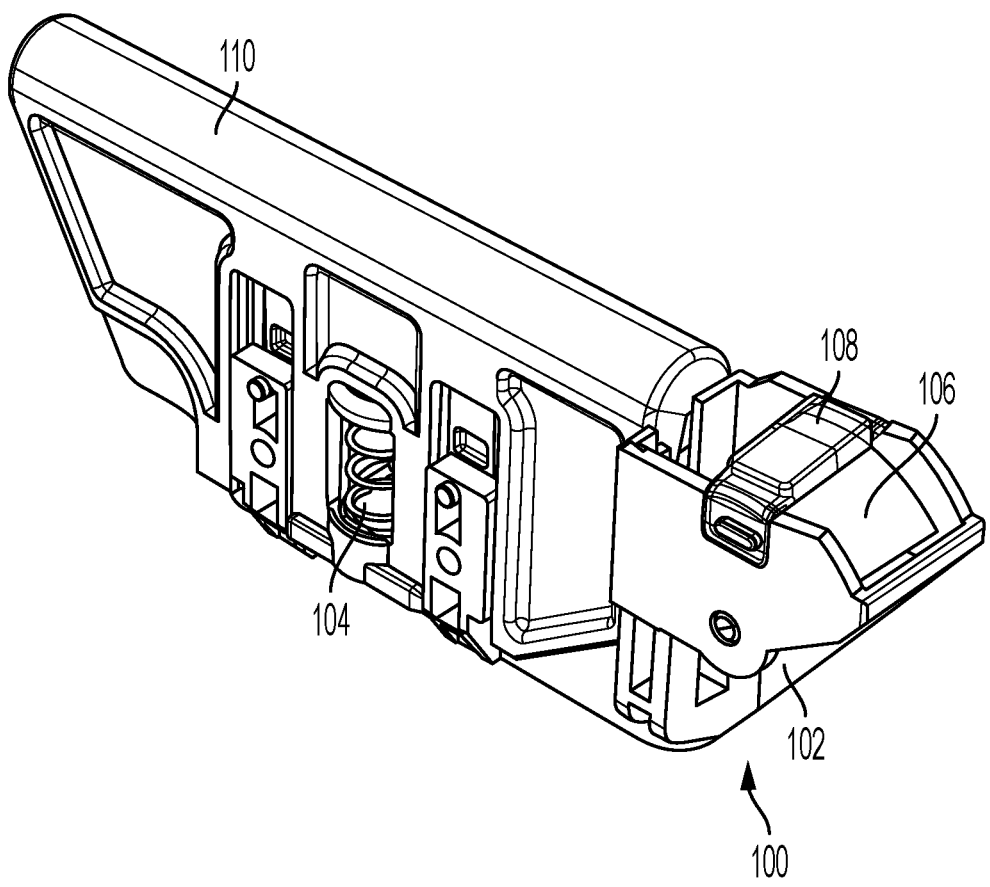
FIG. 1 illustrates an assembly according to an example.

FIG. 1 illustrates an assembly 100 according to an example. Assembly 100 provides a means of determining the level of tension in a child restraint system. In some examples, assembly 100 provides a means of determining tension provided by a seatbelt or similar retention strap to hold a child seat (such as a car seat) in place.

Assembly 100 comprises a chassis 102, a biasing element 104, a wing 106, a window 108, and a blade 110. Assembly 100 is configured to be coupled to a car seat, as shown with respect to FIG. 3. When a strap is run across a portion of blade 110, the strap may exert force on blade 110 which can cause wing 106 to shift to display a level of tension corresponding to the tension of the strap.

Chassis 102 is coupled to window 108. Wing 106 is hingedly coupled to chassis 102 and may selectively contact blade 110. Blade 110 is slidably coupled to chassis 102. Blade 110 is coupled to biasing element 104, and may retain part or all of biasing element 104 within a receptacle incorporated into blade 110.

When blade 110 is pressed downward into chassis 102, a portion of blade 110 contacts wing 106 and applies a force to wing 106. The force causes wing 106 to rotate around its hinge (which defines an axis of rotation for wing 106). As wing 106 rotates, the portion of wing 106 visible through window 108 changes. In some examples, wing 106 may have a simple binary scheme, where one color (such as red) indicates inadequate tension and another color (such as green) indicates sufficient tension to hold a car seat or similar device in place. Other methods of indicating the tension level can also be used, including patterns, textures, symbols (e.g., a smiling face indicating adequate tension and a frowning face indicating inadequate tension), and so forth.

Furthermore, as mentioned above, assembly 100 is wide enough such that the entire width of the retention strap applies force to the assembly 100. In some examples, blade 110, being the portion of assembly 100 that contacts the retention strap, is at least as wide or wider than the retention strap. As a result, if the retention strap is under non-uniform tension (and thus would apply non-uniform-pressure to blade 110), blade 110 may still move downward (that is, spring 104 may still compress) by an amount proportional to the total tension within the full width of the retention strap or affecting a portion of the width of the retention strap. Thus, the blade 110 may always experience the full or maximum tension experienced by the retention strap. Retention straps (e.g., seatbelts) equipped in most cars sold in the United States are typically 46-49 mm wide, due to the requirements of U.S. law. Thus, in some examples, blade 110 may be at least 46 mm wide, and in many examples may be greater than 49 mm wide.

Blade 110 may be pressed downward by a retention strap. Biasing element 104 resists the force applied by the retention strap. Biasing element 104 may provide enough force that, should the retention strap be removed, blade 110 would move upward to its original resting position (e.g., the position where blade 110 is not under pressure from the retention strap). Biasing element 104 may be a spring in some examples.

Hereafter, the first position will refer to a position where blade 110 is not under pressure from the retention strap, and the second position will refer to a position where blade 110 is under pressure from the retention strap.

Figure 2A:
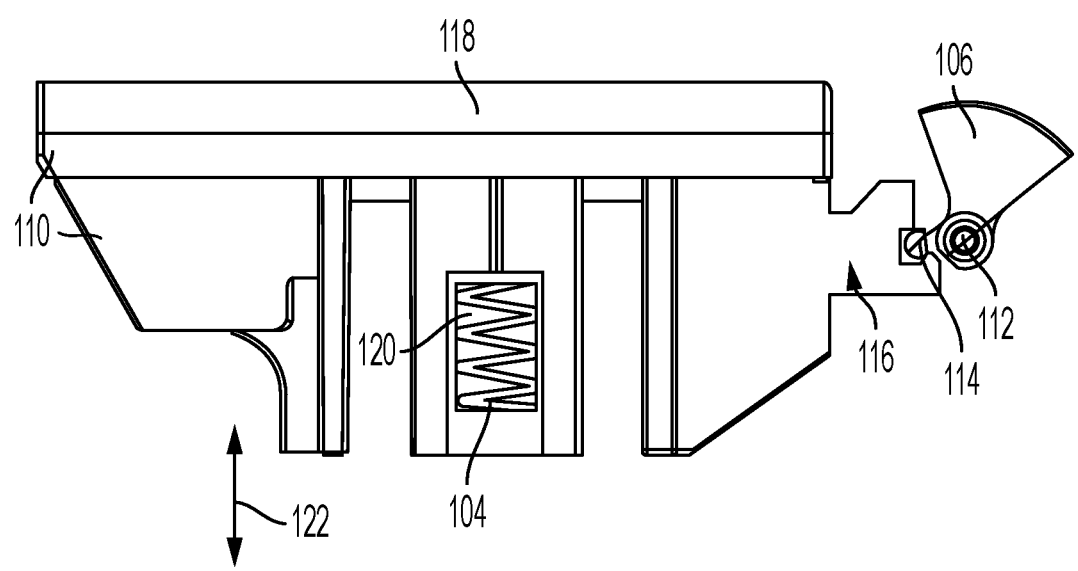
FIG. 2A illustrates an assembly according to an example.
Figure 2B:
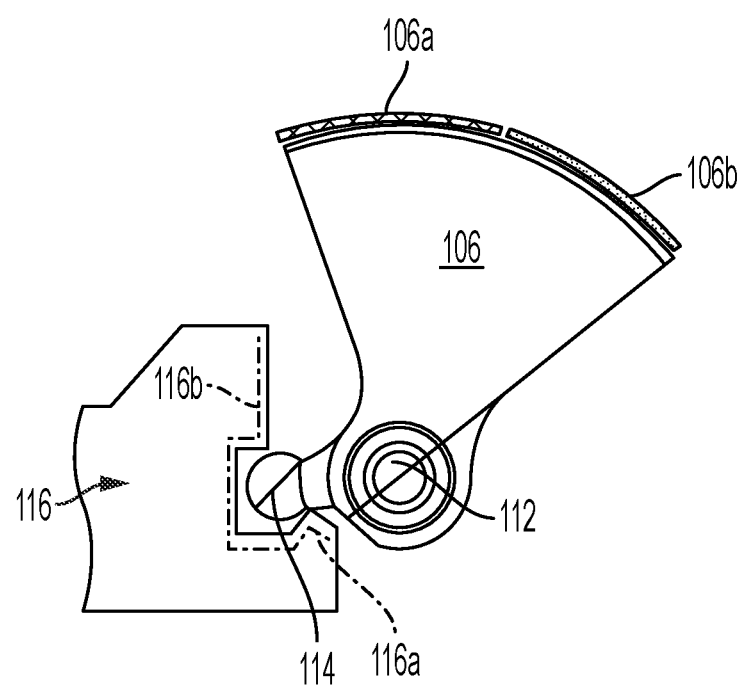
FIG. 2B illustrates an assembly according to an example.

FIGS. 2A and 2B illustrates the assembly 100 in additional detail according to an example.

FIG. 2A illustrates the operational connection between blade 110 and wing 106 according to an example. FIG. 2A illustrates blade 110, wing 106, hinge 112, lever 114, tab 116, receptacle 120, biasing element 104, blade 110, and a top portion 118 of blade 110.

Receptacle 120 contains biasing element 104 and may be located in the middle of blade 110.

Top portion 118 of blade 110 is the portion of blade 110 that contacts a retention strap or similar device. In some examples, top portion 118 may be rounded such that no sharp edges of blade 110 can contact a retention strap when blade 110 is in position in chassis 102.

Tab 116 may be a part of blade 110 at one end of blade 110. Tab 116 may be shaped to hold and move lever 114. As illustrated, tab 116 has one or more protrusions (first tooth 116a and second tooth 116b are discussed with respect to FIG. 2B) that can contact lever 114 and move lever 114 up and down as blade 110 moves up and down.

Lever 114 is coupled to wing 106. Wing 106 is coupled to hinge 112 and may be configured to rotate around an axis of hinge 112. When lever 114 moves, wing 106 may rotate around hinge 112. For example, if lever 114 is coupled to wing 106, then when blade 110 moves, the teeth of tab 116 may force lever 114 to move down in a circular motion around hinge 112. Because lever 114 and wing 106 are coupled together (and, in this example, hingedly coupled to hinge 112), wing 106 will move a related distance in the same direction of rotation around hinge 112 as lever 114 moves. In FIG. 2A, lever 114 is shorter (from the center of hinge 112 to the most distant part of lever 114) compared to wing 106. Therefore, wing 106 will move through the same number of degrees (of an arc) as lever 114, but will move a larger absolute distance. If lever 114 is extended, or wing 106 shortened, the relative distances traveled may be manipulated. Thus, for any given force applied to blade 110, the length of lever 114 and wing 106 may be designed to provide a desired level of granularity to the measurement of tension in the retention strap. Additional details about the movement of wing 106 are discussed with respect to FIG. 2B.

Thus, the rotational movement of wing 106 may depend directly on the force applied to blade 110 by a retention strap. Because biasing element 104 resists the force applied by the retention strap, any given compression of biasing element 104 may correspond to a precise amount of force applied by the retention strap. Thus, any "vertical" motion of blade 110 (that is, motion in the directions indicated by the arrow 122) may correspond to an amount of force and an amount of movement of wing 106. Accordingly, it is possible, knowing the characteristics of biasing element 104, to define on wing 106 ranges of the window 108 facing surface of wing 106 that correspond to adequate or inadequate tension to hold a car seat in place.

FIG. 2B illustrates wing 106 and tab 116 in greater detail according to an example. FIG. 2B shows lower tooth 116a and upper tooth 116b of tab 116, as well as a first region 106a and second region 106b of the surface of wing 106.

Lower tooth 116a extends away from the main body of tab 116 past the end of lever 114. As a result, when lower tooth 116a is moving upward (for example, because blade 110 is under less or progressively less tension), lower tooth 116a catches lever 114 and causes wing 106 to rotate such that first region 106a moves toward a displayed position (for example, a position where first region 106a is visible through window 108), indicating that the tension from the retention strap is not adequate to hold a car seat in place. In some examples, lever 114 has a rounded portion that sits between lower tooth 116a and the main body of tab 116. In some examples, the rounded portion may prevent lever 114 from occupying a position where lower tooth 116a cannot contact it when upper tooth 116a is moving upward (that is, when the tension is lessening, zero, or near zero).

Upper tooth 116b extends a short distance, relative to lower tooth 116a, from the main body of tab 116. Upper tooth 116b may otherwise be rectangular or generally rectangular. For example, upper tooth 116b may be relatively tall, in a vertical direction, such that when blade 110 is experiencing a large amount of force (for example, the retention strap is under high tension), wing 106 will not rotate past a certain angle (relative to the position of wing 106 when the retention strap is not under tension). As an example, the lower corner of upper tooth 116b may contact lever 114 (and many contact a rounded end portion of lever 114). The lower corner of upper tooth 116b may force lever 114 downward (thus causing wing 106 to rotate to display second region 106b in window 108). At a certain point, lever 114 may be rotated far enough that it can no longer contact the vertex (or edge) of the lower corner of upper tooth 116b. At this point, lever 114 may be in contact with the side of upper tooth 116b, which may be relatively flat in a vertical direction. Thus, as tab 116 continues to move down, the position of upper tooth 116b and lever 114 relative to one another no longer changes (that is, rotational movement of wing 106 and lever 114 no longer occurs). In some examples, when upper tooth 116b and lever 114 reach this position, wing 106 may be rotated to a final position (relative to the position of wing 106 when the tension level of the retention strap is at or above a designated minimum where wing 106 no longer moves and second region 106b is displayed through window 108.

First region 106a of wing 106 corresponds to a region where tension from a retention strap is not adequate to properly install a car seat in place. Second region 106b of wing 106 corresponds to a region where tension from a retention strap is adequate to hold a car seat in place. Depending on the size of window 108, both regions may be visible to a user at the same time. In such cases, it is preferential to define the tension as inadequate when both first region 106a and second region 106b are visible simultaneously. That is, it is preferable that wing 106 be understood to indicate that the tension level is adequate only when the second region 106b is the only region visible through window 108. If any portion of the first region 106a is visible, it may be understood that wing 106 indicates the tension level is not adequate. However, it is also possible to define the tension as adequate when both first region 106a and second region 106b are visible simultaneously. In some examples, first region 106a and second region 106b may be color coded. For example, first region 106a may be color-coded red and second region 106b may be color-coded green. Any combination of colors may be used. In other examples, other indicators of tension may be used (for example, textures, markings, patterns, and so forth).

Figure 3A:
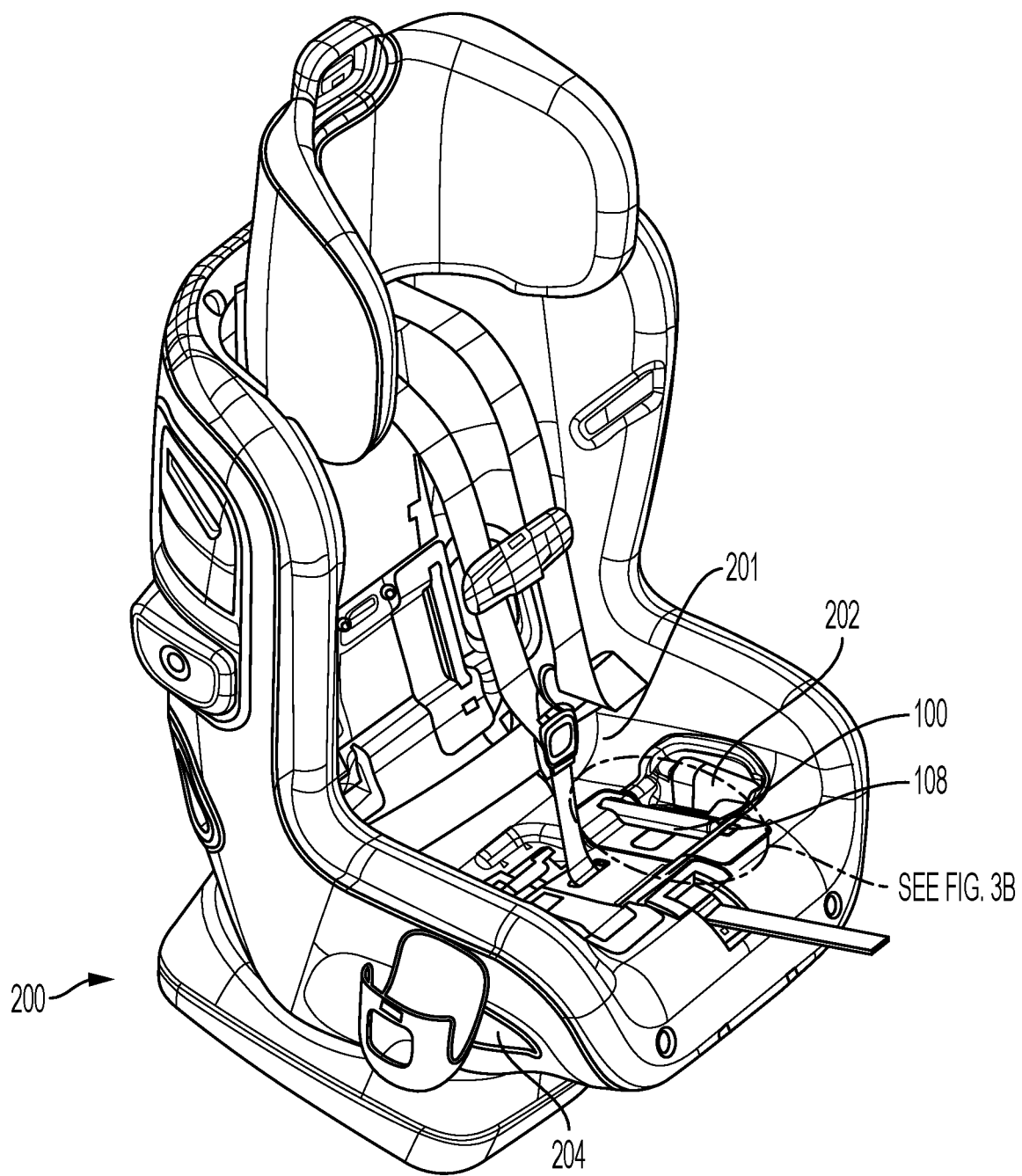
FIG. 3A illustrates a car seat according to an example.

FIG. 3A illustrates assembly 100 slotted into a base 201 of a car seat 200 according to an example. The car seat 200 includes a first hole 202 and a second hole 204 through which a retention strap may pass. Base 201 is the seat bottom of car seat 201 angled or parallel with respect to the ground. When under sufficient tension, the retention strap presses down against assembly 100. Window 108 is shown toward the front of car seat 200. However, window 108 may be located in other positions. In some examples, window 108 may be located on the back of car seat 200, on a side of car seat 200, or in another position. In some examples, additional tensions indicators may be included on car seat 200 in various positions, so that the tension level may be seen from various angles and even if some portions of car seat 200 are obstructed.

Figure 3B:
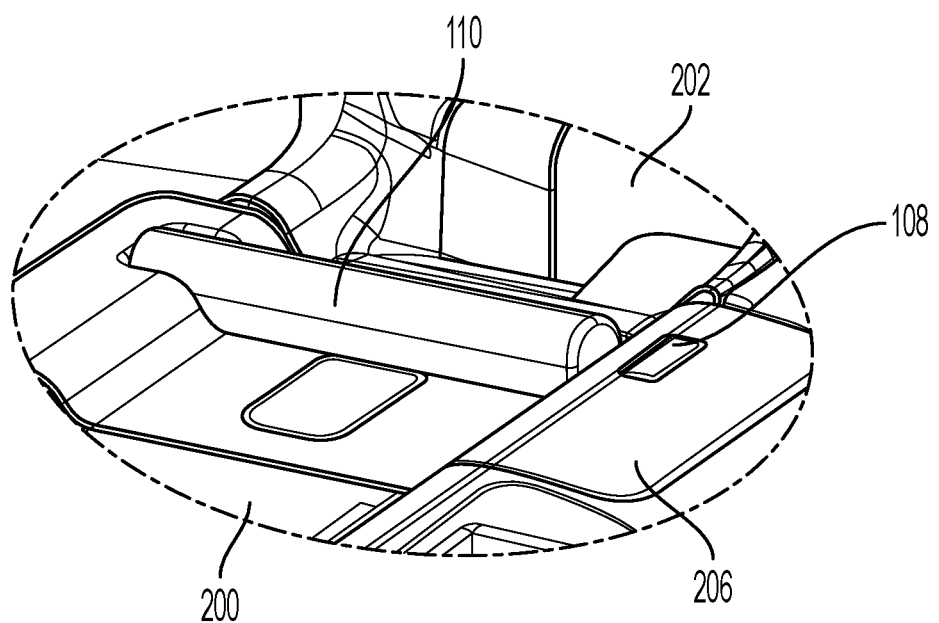
FIG. 3B illustrates a car seat according to an example.

FIG. 3B provides a closeup view of assembly 100 in car seat 200 according to an example. In FIG. 3A, window 108 and the top of blade 110 can be seen in the first position (e.g., not under pressure from a retention strap). Also shown is adapter 206, which is coupled and/or incorporated into car seat 200 and configured to hold chassis 102 and receive blade 110. Window 108 provides visual access to wing 106 (not visible) so that a user can see the level of tension applied by the retention strap.

In some examples, adapter 206 and chassis 102 provide sufficient travel such that blade 110 can move vertically (e.g., up and down relative to the base of car seat 200), but blade 110 cannot move in other dimensions or moves only minimally in other dimensions. That is, adapter 206 and chassis 102 may minimize racking experienced by blade 110 (such that blade 110 remains in approximately the same relative posture regardless of the vertical position of blade 110 in adapter 206 and/or chassis 102).

Figure 4:
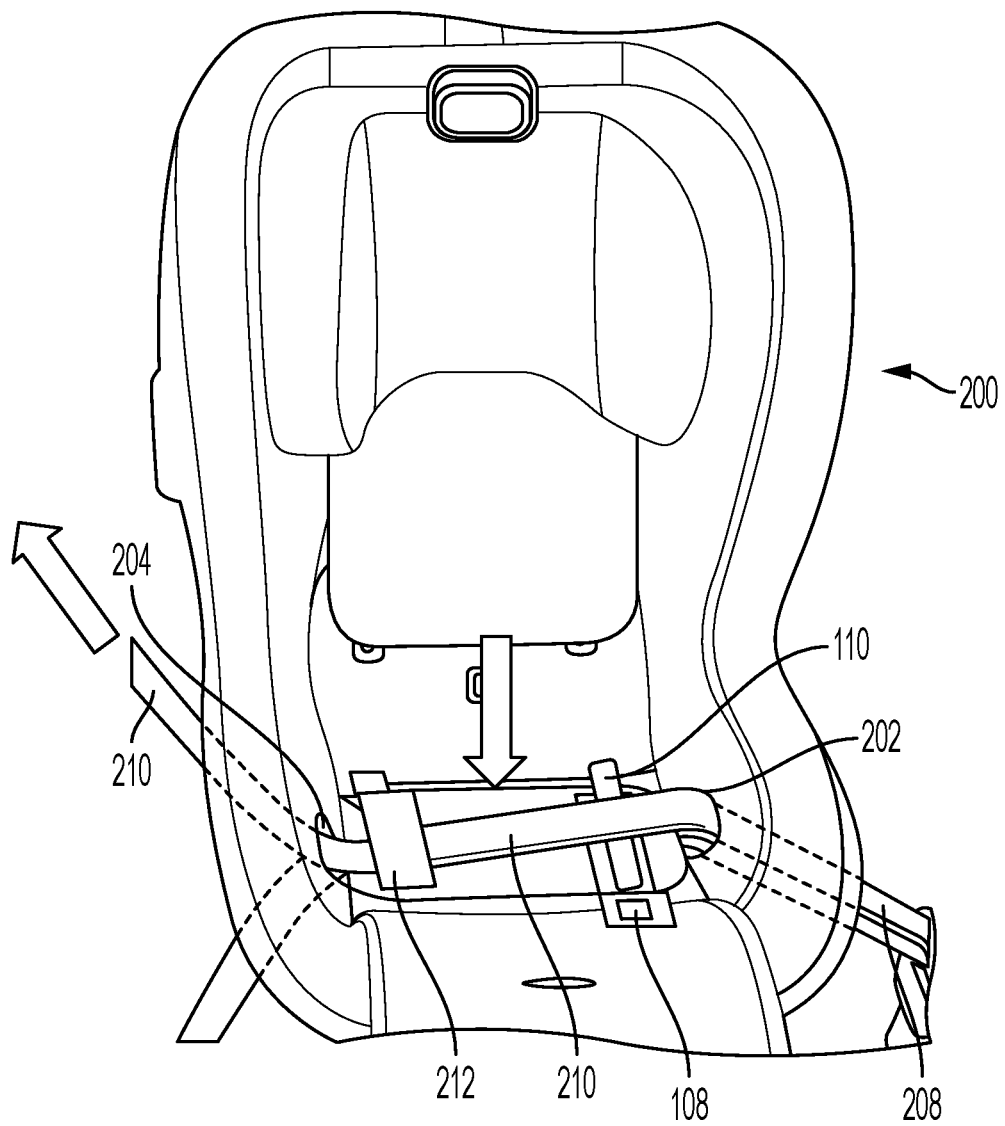
FIG. 4 illustrates a car seat according to an example.

FIG. 4 illustrates operation of car seat 200 according to an example. FIG. 4 shows a first retention strap 208 and a second retention strap 210, a clamp 212, window 108, and blade 110.

First retention strap 208 and second retention strap 210 may be part of the same general retention strap apparatus. For example, most 3-point retention strap systems in modern automobiles have a shoulder belt that goes across the front of the body, from a shoulder to the side of the hip opposite the shoulder, and a lap belt that goes across the lap (or legs). In most modern cars, the lap and shoulder belts meet roughly at a buckle connector that inserts into a buckle receiver. First retention strap 208 may be a lap belt and second retention strap 210 may be a shoulder belt in some examples.

Car seat 200 may be installed in one or more of at least two ways. In a first position, car seat 200 is installed using an assembly 100 installed in the base of car seat 200. In a second position, car seat 200 is installed using an assembly 100 installed in the back of car seat 200.

When installing car seat 200 in the first position, the retention strap is passed through one of first hole 202 or second hole 204 over the base of car seat 200 and then passed through the other hole. Clamp 212 is engaged once the retention strap is under sufficient tension to hold the retention strap in place and maintain the level of tension. The retention strap may be buckled into a receptacle, for instance, in a car. For example, a user wishes to install car seat 200. The user passes the retention strap through the second hole 204 across the base of car seat 200 and then through first hole 202 (and may buckle the retention strap in place using a receptacle installed into the car (for example, if the retention strap is a seatbelt, the user may buckle the seatbelt into a buckle installed in the car). The user may then apply force to the retention strap until the wing 106 indicates that tension is adequate. The user may then engage clamp 112 to hold the retention strap under the desired and/or indicated level of tension. When the retention strap is a seatbelt, the user may pass both the lap portion and shoulder portion of the seatbelt through the holes together (e.g., treating them as a single unit). A similar process applies in the other direction, except the retention strap passes through first hole 202, across the base, and through second hole 204 before being buckled, placed under tension, and clamped in place using clamp 212).

To install car seat 200 in the second position, an identical process as described above may be used. However, in this variation, the first hole 202 and second hole 204 will be located in the back of car seat 200, and assembly 100 will be installed between the two holes in the back of car seat 200.

Clamp 212 may also be used to increase tension in one or more of the retention straps, including second retention strap 210. For example, when clamp 212 is engaged into a locked position, clamp 212 may apply additional pressure to second retention strap 210, thus increasing tension in second retention strap 210.

Figure 5A:
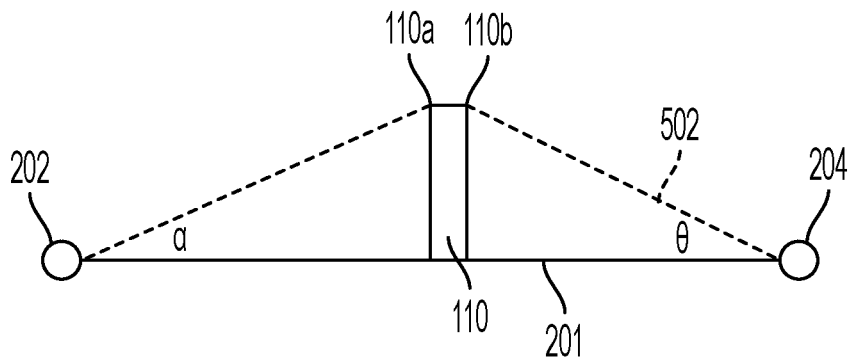
FIG. 5A illustrates the positioning of a blade according to an example.
Figure 5B:
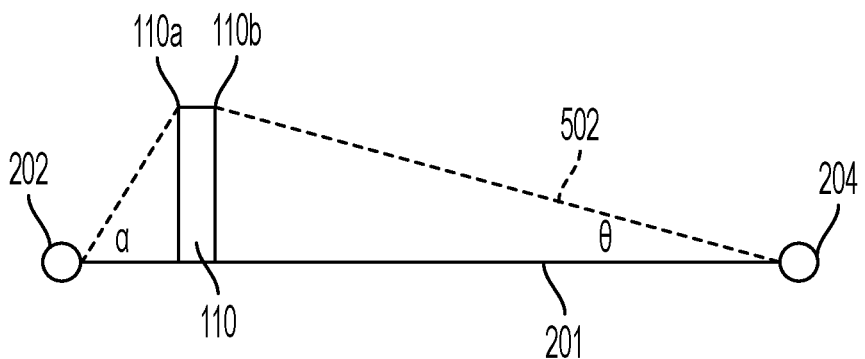
FIG. 5B illustrates the positioning of a blade according to an example.
Figure 5C:
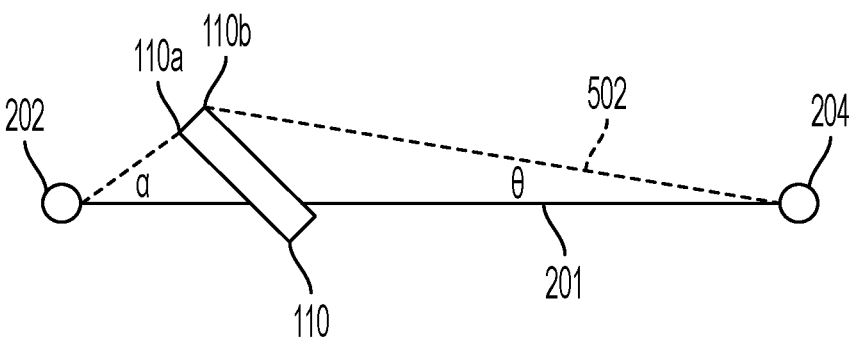
FIG. 5C illustrates the positioning of a blade according to an example.

FIGS. 5A through 5C illustrate the positioning of the blade 110 along base 201 of car seat 200 according to various examples. FIGS. 5A through 5C each include a retention strap 502, which may be any retention strap or similar device that applies a force on blade 110. Two circles represent first hole 202 and second hole 204 of car seat 200. Blade 110 is shown with a first side 110a and a second side 110b. First side 110a is opposite second side 110b.

In FIG. 5A, blade 110 (and by extension, apparatus 100) is positioned substantially in the center of base 201 of the car seat 200. Blade 110 is positioned at or approximately at a right angle to base 201. Retention strap 502 passes over blade 110 from first hole 202 to second hole 204 (and/or from second hole 204 to first hole 202). Because blade 110 is positioned substantially in the center of base 201, the angles α and Θ are equal or approximately equal. Accordingly, retention strap 502 exerts roughly equal force on first side 110a and second side 110b. As a result, the vertical components of the force exerted on first side 110a and second side 110b (that is, the portion of the force directed into base 201 of car seat 200) are summed together to determine a total vertical force component, which may be non-zero when retention strap 502 is under tension, while the horizontal component of the force exerted on first side 110a and second side 110b (that is, the component of the force orthogonal to the vertical components of the force) cancel each other out (that is, the sum of the horizontal components of the force are zero).

In FIG. 5B, blade 110 is positioned closer to one of the holes 202, 204 in car seat 200 than the other. Blade 110 is positioned at or approximately at a right angle to base 201. In this examples, blade 110 is positioned closer to first hole 202 than to first hole 204. As a result, angles α and Θ are not equal. Accordingly, the forces exerted on first side 110a and second side 110b are not equal. As a result, while the total vertical component of the force is still non-zero, the total horizontal component of the force exerted on first side 110a and second side 110b is also non-zero.

In FIG. 5C, blade 110 is positioned closer to one of the holes 202, 204 than the other. In this example, blade 110 is positioned closer to first hole 202. Blade 110 is also rotated away from a right-angle with base 201. The degree of rotation may vary depending on the precise position of blade 110 (and/or apparatus 100) along base 201. By rotating base 110, angles α and Θ may be made approximately equal or equal relative to the example given in FIG. 5B. Once angles α and Θ are equalized, the horizontal component of the forces exerted on first side 110a and second side 110b may be made equal, such that the sum of the horizontal components of the force is once again zero as in FIG. 5A.

Ensuring that the sum of horizontal forces operating on blade 110 are zero may reduce the amount of movement of blade 110 in a non-vertical direction. This, in turn, may reduce error in tension measurements by apparatus 100 and may reduce wear-and-tear on blade 110 and other parts of apparatus 100 and/or car seat 200 as blade 110 may be less likely to rub against other parts of apparatus 100 and/or car seat 200.

Figure 6:
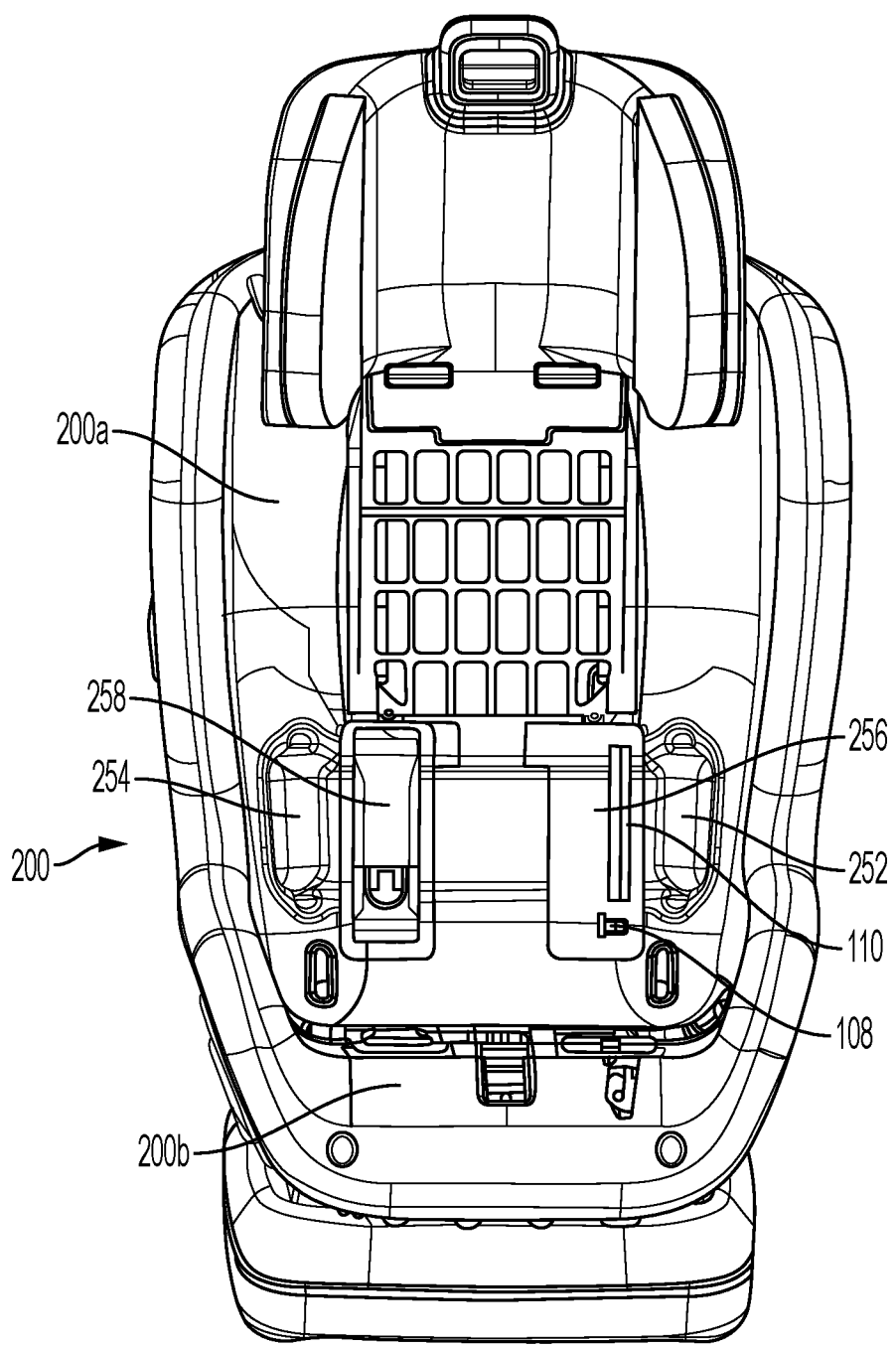
FIG. 6 illustrates a car seat according to an example.

FIG. 6 illustrates car seat 200 according to an example. Car seat 200 includes a seat back 200a ("back 200a"), a seat base 200b ("base 200b"), a first hole 252, a second hole 254, a chassis 256, a clamp 258, and blade 110 (assembly 100 is installed within chassis 256, but is not visible except for blade 110).

In FIG. 6, the elements of FIGS. 3A, 3B, 4, and so forth, may all also be present. First hole 252 is present in one side of back 200a of car seat 200, clamp 258 is coupled to back 200a between second hole 254 and first hole 252, chassis 256 is coupled to back 200a between first hole 252 and second hole 254. An assembly 100 may be installed in chassis 256, and blade 110 of assembly 100 is visible within chassis 256.

The operation of car seat 200 is similar to the operation described with respect to FIG. 4. A retention strap may be passed through first hole 252, across blade 110 and clamp 258, and through second hole 254, or the retention strap may be passed through second hole 254, across blade 110 and clamp 258, and through first hole 252. The user may apply tension to the retention strap until wing 106 indicates an adequate amount of tension through window 108. The user may then use clamp 258 to clamp retention strap in place under tension.

FIGS. 7A-7D illustrate a number of variations on blade 110 according to various examples.

Figure 7B:
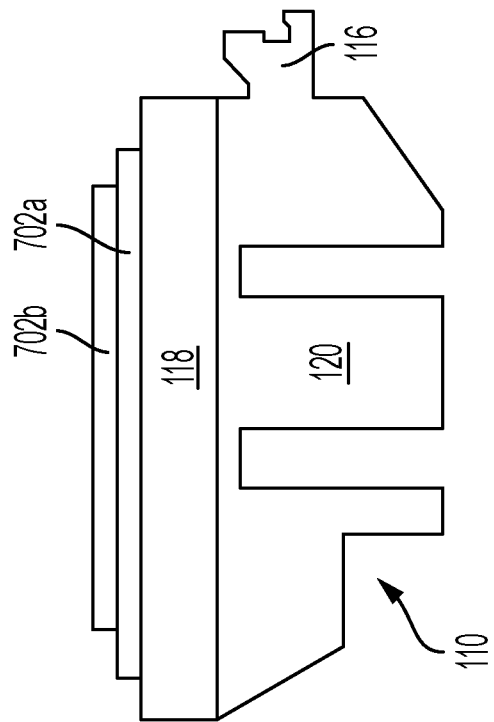
FIG. 7B illustrates a stepped blade topology according to an example.
Figure 7A:
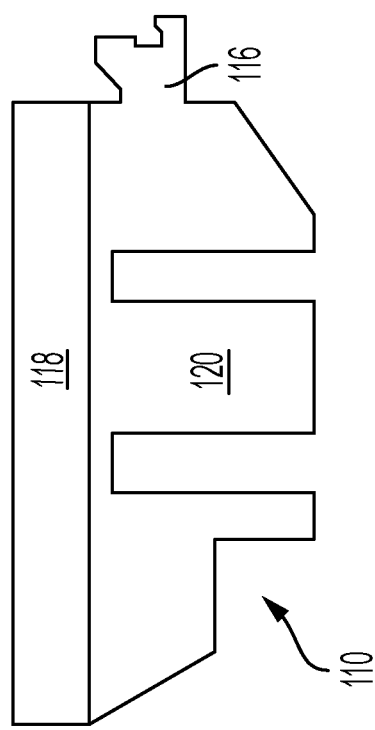
FIG. 7A illustrates a flat blade topology according to an example.

FIG. 7A illustrates blade 110 with a flat top portion 118 according to an example. That is, top portion 118 is level along the longitudinal axis (e.g., the longest axis) of blade 110. The top portion 118 may be curved along directions other than those parallel to the longitudinal axis (e.g., the top portion 118 may be rounded off or slanted.

FIG. 7B illustrates blade 110 with a stepped top portion 118 according to an example. The top portion 118 includes a first stepped portion 702a and a second stepped portion 702b. Stepped portions 702a, 702b have longitudinal axes parallel to the longitudinal axis of blade 110 and top portion 118. First stepped portion 702a raises the top portion 118 by an amount (for example, a millimeter or more, a centimeter or less, and so forth) above top portion 118. Second stepped portion 702b raises the top portion 118 by an amount above first stepped portion 702a. In this manner, top portion 118 may be thicker or taller in some regions (e.g., the center, the left side, the right side, and so forth) than in other regions.

Figure 7C:
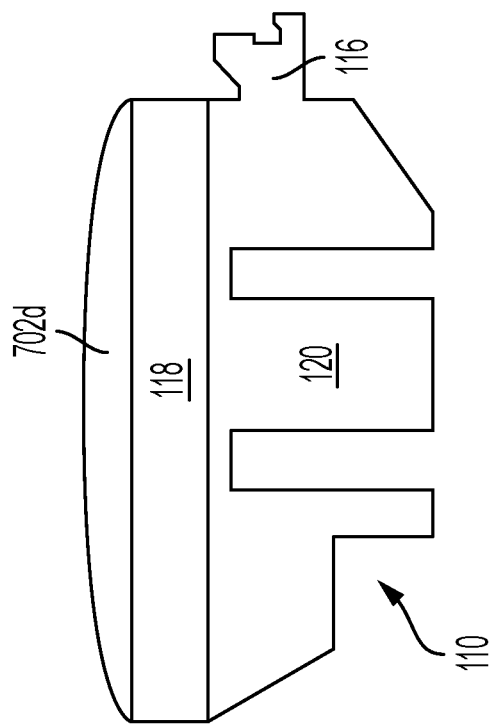
FIG. 7C illustrates a concave blade topology according to an example.

FIG. 7C illustrates blade 110 with a concave top portion 118 according to an example. The top portion 118 includes a concave element 702c. Concave element 702c protrudes a greater distance from blade 110 near the ends of top portion 118 and protrudes a lesser distance (or not at all) from blade 110 near the center of top portion 118.

Figure 7D:
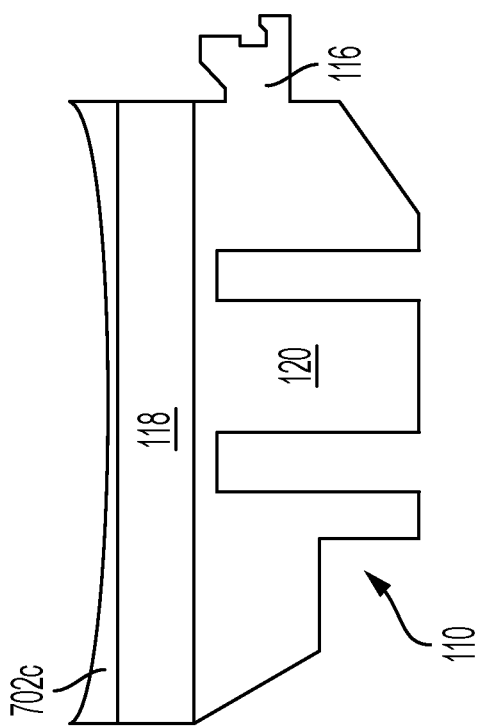
FIG. 7D illustrates a convex blade topology according to an example.

FIG. 7D illustrates a blade 110 with a convex top portion 118. Top portion 118 includes a convex element 702d.

Convex element 702c protrudes a greater distance from blade 110 near the center of top portion 118 and protrudes a lesser distance (or not at all) from blade 110 near the ends of top portion 118.

FIGS. 7A-7D illustrate variations of blade 110 that can be used to account for twisting, turning, and wrapping of the retention strap. When the retention strap twists, turns, wraps, and so forth, the tension applied along the cross-section of the retention strap may change (compared to if the retention strap has no or few twists, turns, and/or wraps). Likewise, when the retention strap passes over top portion 118 of blade 110, the shape of top portion 118 can change the distribution of tension across the cross-section of the retention strap.

For example, convex top portion 118 illustrated in FIG. 7D will tend to concentrate the distribution of tension along the cross-section of the retention strap toward the centermost regions of blade 110 with which the retention strap is in contact.

Similarly, stepped top portion 118 illustrated in FIG. 7B will tend to concentrate the distribution of tension along the cross-section of the retention strap toward the region of blade 110 corresponding to the highest step of stepped top portion 118 (which, in FIG. 7B, is second stepped portion 702b). Depending on the placement of the highest step of top portion 118, tension may be concentrated toward the ends of blade 110 or the center region of blade 110, or to another region.

In contract, concave top portion 118 of FIG. 7C will tend to concentrate the distribution of tension along the cross-section of the retention strap in whichever direction is away from the center region of blade 110 with which the retention strap is in contact.

Flat top portion 118 of FIG. 7A will, compared to the other examples, not tend to concentrate the distribution of tension across the retention strap, but will instead tend to uniformly distribute tension across each region of top portion 118 with which the retention strap is in contact.

The placement of spring 104 may be altered and/or the precise geometry of top portion 118 altered to concentrate the distribution of tension across the retention strap above the spring. In some examples, this may be accomplished by placing the highest portion of top portion 118 above spring 104.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A tension indicator assembly for a child restraint system comprising:
   a chassis;
   a blade slidably coupled to the chassis;
   a biasing element coupled to the chassis and to the blade and configured to bias the blade in a first position;
   a wing pivotably coupled to the chassis and configured to selectively contact the blade; and
   a tab coupled to the blade and configured to selectively pivot the wing based on a position of the blade.

2. The tension indicator of claim 1 wherein the wing further comprises:
   a first section corresponding to a first range of tensions;
   a second section corresponding to a second range of tensions; and
   a lever, wherein the tab is configured to contact the lever.

3. The tension indicator of claim 2 wherein the position of the blade is based on a force applied to the blade.

4. The tension indicator of claim 3 wherein a greatest tension of the first range of tensions is less than a least tension of the second range of tensions; and
   wherein the wing is configured to pivot from a position corresponding to the first section to a position corresponding to the second section.

5. The tension indicator of claim 1 wherein the blade is at least 46 mm wide.

6. The tension indicator of claim 1 wherein the blade includes a rounded top-section configured to contact a retention strap.

7. The tension indicator of claim 1 wherein the blade includes a recess configured to hold the biasing element.

8. The tension indicator of claim 1 wherein the biasing element is a spring.

9. The tension indicator of claim 1 further comprising a transparent viewport coupled to the chassis and coupled above at least a portion of the wing.

10. A car seat comprising:
    a base; and
    a tension indicator, the tension indicator including:
      a chassis;
      a blade slidably coupled to the chassis;
      a biasing element configured to bias the blade into a first position;
      a wing pivotably coupled to the chassis and configured to selectively contact the blade; and
      a tab coupled to the blade and configured to selectively pivot the wing based on a position of the blade.

11. The car seat of claim 10 wherein the slot is configured to retain the blade such that movement of the blade within the slot is restricted in at least one direction.

12. The car seat of claim 10 wherein the wing further comprises:
a first section corresponding to a first range of tensions;
a second section corresponding to a second range of tensions; and
a lever, the tab being configured to contact the lever.

13. The car seat of claim 12 wherein the position of the blade is based on a force applied to the blade.

14. The car seat of claim 13 wherein a greatest tension of the first range of tensions is less than a least tension of the second range of tensions; and
applying at least a threshold force to the blade is configured to cause the wing to pivot from a position corresponding to the first section to a position corresponding to the second section.

15. The car seat of claim 10 wherein the blade is at least 46 mm wide.

16. The car seat of claim 10 wherein the blade includes a rounded top-section configured to interface with a retention strap.

17. The car seat of claim 10 wherein the blade includes a recess configured to hold the biasing element.

18. The car seat of claim 10 wherein the biasing element is a spring.

19. The car seat of claim 10 further comprising a transparent viewport coupled to the chassis and coupled above at least a portion of the wing, the transparent viewport placed to be visible to a user of the car seat.

20. The car seat of claim 10 wherein the base further comprises:
a first opening configured to receive a retention strap;
a second opening configured to receive the retention strap;
and a joint configured to selectively open and close the first and second openings.

21. The car seat of claim 10 wherein the base includes a slot configured to receive the tension indicator, and the tension indicator is configured to be removably installed in the slot.

22. The car seat of claim 10 wherein a section of the blade is shaped to concentrate a distribution of tension to a region of the blade, wherein the tension is due to a retention strap contacting the blade.

23. The car seat of claim 22 wherein the blade is shaped according to at least one of the following shapes:
a stepped shape;
a convex shape;
a concave shape; and
a flat shape.

* * * * *